R. W. A. WARREN.
AUTOMATIC CLUTCH DIFFERENTIAL ESPECIALLY FOR MOTOR CARS.
APPLICATION FILED AUG. 7, 1919.
1,348,673. Patented Aug. 3, 1920.
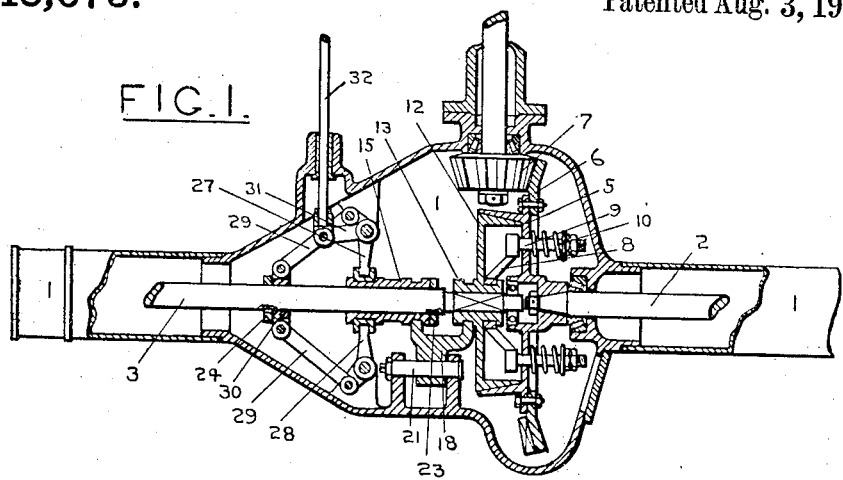
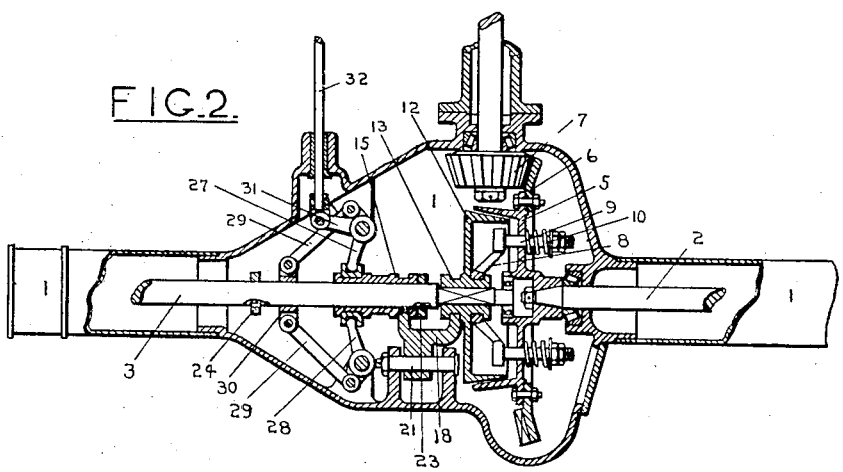
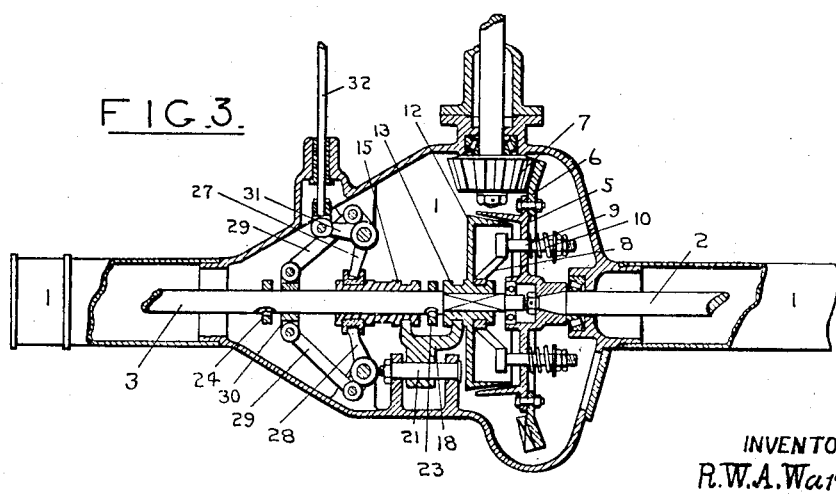
INVENTOR
R.W.A.Warren
BY
ATTORNEYS

UNITED STATES PATENT OFFICE.

ROBERT WILLIAM ALLISON WARREN, OF KATANNING, WESTERN AUSTRALIA, AUSTRALIA.

AUTOMATIC CLUTCH-DIFFERENTIAL ESPECIALLY FOR MOTOR-CARS.

1,348,673.            Specification of Letters Patent.        Patented Aug. 3, 1920.

Application filed August 7, 1919. Serial No. 315,939.

*To all whom it may concern:*

Be it known that I, ROBERT WILLIAM ALLISON WARREN, a subject of the King of Great Britain and Ireland, residing at Katanning, State of Western Australia, Commonwealth of Australia, have invented certain new and useful Automatic Clutch-Differentials Especially for Motor-Cars, of which the following is a specification.

This invention relates to an automatic friction clutch differential which I have designed to take the place of the bevel gear wheel differential heretofore employed in the driving of motor cars, motor lorries and the like. It is designed to make use of the considerable centrifugal force or momentum of the car and passengers under which, when turning a corner, the car body and consequently the axle housing tends to continue in a straight course rather than to move with the wheels in the new direction.

According to my invention the two parts of the live axle carry the two parts of the clutch, one on each, and the one part of the axle (either one) is so mounted as to be capable of a slight automatic endwise movement in its housing, sufficient to draw apart the two parts of the clutch when necessary. For the purpose of this specification I will assume that it is the left hand live axle that is capable of this movement, the right hand live axle being so held as to be incapable of such movement.

In order that my invention may be clearly understood I will describe the same with reference to the accompanying drawings which are all horizontal central sectional views and in which:—

Figure 1 shows the clutch differential engaged for driving.

Fig. 2 shows it disengaged (automatically) when turning on the road.

Fig. 3 shows it disengaged (by means of the hand lever) for the purpose of hand maneuvering as in the garage.

In the drawings 1 represents the axle housing which is constructed in sections as may be convenient for the fitting of the parts thereinto and the assembling of them together, 2 represents the right hand live axle which carries the right hand road wheel, and 3 the left hand live axle which carries the left hand road wheel.

The right hand live axle 2 is carried in roller bearings within the axle housing 1.

To the inner end of the right hand live axle 2 is secured by means of a cone, or otherwise fastened, to the female member 5 of a cone clutch on to the outside of which the toothed bevel or crown wheel 6 of the main drive is bolted, thus the right rear road wheel, through the axle 2 and bevel wheels 6 and 7, is always coupled up with the rest of the transmission.

To this female member 5 of the clutch is attached the clutch spider 8 by means of bolts 9 encircled by springs 10 upon the back of the clutch member, the tension of such springs being adjustable by removing the inspection plate on the axle housing.

The complementary or male member 12 of the clutch is immediately adjacent to the clutch spider 8, and both are carried by the clutch collar 13.

The left hand live axle 3 is so mounted in its bearings as to have slight lateral play to the right and to the left relatively to its housing. Its end portion is castellated or squared into the clutch collar 13 so that although capable of slight relative endwise movement the two must rotate together.

Mounted upon the left hand live axle 3 a short distance from the clutch shaft or collar 13 is a slidable sleeve 15 having a groove at each end, and this sleeve 15 is coupled to the clutch shaft or collar 13 by a yoke 18 having a flange at each end. The yoke 18 is slidably mounted upon a fixed rod 21 carried by the housing 1.

Secured upon the left hand live axle 3 are two collars 23 and 24, the one 23 positioned near the end of the axle between the clutch shaft or collar 13 and the slidable sleeve 15, and the other 24 positioned about the center of the axle near its main roller bearing.

Within that portion of the housing inclosing the left hand axle 3 and pivoted thereto are two levers 27 and 28 the inner ends of which are adapted to engage the groove on the outer end of the sleeve 15 and press the sleeve outward, while their outer ends are connected by pushrods 29 to a strap 30 surrounding the axle 3 adjacent to the inward face of the collar 24 thereon. The one lever 27 has an arm 31 the end of which is connected by a rod 32 to a lever placed conveniently near to the driver's seat and against a quadrant to which it may be locked. Normally this lever swings in the middle of the quadrant and thus acts as an indicator of how the clutch differential is working, but by pulling it back till a catch is engaged it pulls the differential free and holds it so until the car is ready to move in the straight. The front end of the rod with the lever and quadrant are not shown in the drawings being of any common pattern. This is provided especially for when it is desired to turn the car about very slowly as by pushing it.

For the purposes of illustration and description of my invention I have chosen a type of friction clutch commonly known as a "cone clutch," but my invention as herein described relates to any clutch of any type which may be fitted and bolted or otherwise fastened to or incorporated with the crown wheel in any axle of any kind of automobile car or lorry.

The operation of my invention is as follows:

When the car is traveling forward the two parts of the clutch are engaged as shown in Fig. 1, and the two live axles 2 and 3 transmit power to the right and left hand road wheels.

When turning forward to the left or in reverse gear to the left the left hand live axle 3 is held through the left road wheel to the road but the considerable centrifugal force or momentum of the load causes the car with the axle housing to slide slightly along the axle 3 to the right. The collar 23 near the inner end of the axle therefore presses against the end of the sleeve 15, the collar upon the inner end of which pulls upon the yoke 18 which in turn pulls upon the clutch collar 13 and thereby withdraws the clutch member 12 from the clutch member 5 and allows each of the rear road wheels to revolve at its proper speed in relation to the radius of the curve being traveled. This position of the parts is shown in Fig. 2.

Similarly when the car is turning to the right forward or in reverse the left hand road wheel is held to the road but the centrifugal force or momentum of the car pressing over to the left causes the collar 24 near the center of the axle 3 to push the strap 30 inward and this motion is conveyed by the push rods 29 and levers 27 and 28 to the grooved slidable sleeve 15 pulling the sleeve along the axle outward. The sleeve 15 carries with it the flanged yoke 18 and the clutch collar 13 and releases the clutch as in the first instance. This position of the parts is not shown in the drawings.

At times it may be desired to release the two road wheels to enable the car to be turned about freely by pushing it, this is accomplished by operating the lever at the front end of the rod 32 and thereby pulling the rod, which through the arm 31 rocks the lever 27 and moves the grooved sleeve 15 outward, which through the flanged yoke 18 then releases the clutch as before.

The reason why the one road wheel is always coupled up with the transmission is that on rutty roads or on those with excessive camber, if both wheels were used to operate the clutch, the conditions might be such as to stall the car.

What I claim as my invention is:—

1. An automatic friction clutch differential comprising a live axle; a clutch member secured upon the inner end of one part of the live axle; a complementary clutch member rotatable with but movable slightly endwise upon the inner end of the second part of the live axle, the two parts of the live axle being mounted in ball or roller bearings in the axle housing; and means whereby sidewise movement of the axle housing with the car body disengages the two members of the clutch.

2. An automatic friction clutch differential comprising a live axle; a clutch member secured upon the inner end of one part of the live axle; a toothed crown wheel carried by the clutch member; a toothed transmission wheel meshing with the crown wheel; a complementary clutch member rotatable with but movable slightly endwise upon the inner end of the second part of the live axle, the two parts of the live axle being mounted in ball or roller bearings in the axle housing; and means whereby sidewise movement of the axle housing with the car body disengages the two members of the clutch.

3. An automatic friction clutch differential comprising, a live axle; a clutch member 5 secured upon the inner end of one part 2 of the live axle; a crown wheel carried by the clutch member; a transmission wheel meshing with the crown wheel; a complementary clutch member 12 mounted by means of a collar 13 upon the inner end of the second part 3 of the live axle slidable endwise thereon but rotatable therewith, said collar 13 carrying also the clutch spider, the two parts of the live axle being mounted in ball or roller bearings in the axle housing; a sleeve 15 slidably mounted upon the part 3 of the axle near its inner end; two collars 23 and 24 secured upon the part 3 of the axle one near its inner end between the sleeve 15 and the end and one near its center; means for connecting the sleeve 15 to the collar 13 of the clutch member; a yoke 30 encircling the part 3 of the axle adjacent to the inward face of the collar 24 with means for connecting it to the sleeve 15; and means for moving the sleeve 15 independently of the movement of the car.

4. An automatic friction clutch differential comprising, a live axle; a clutch member 5 secured upon the inner end of one part 2 of the live axle; a crown wheel on the clutch member: a transmission wheel meshing with the crown wheel; a complementary clutch member 12 mounted by means of a grooved collar 13 upon the inner end of the second part 3 of the live axle slidable endwise thereon but rotatable therewith, the two parts of the live axle being mounted in ball or roller bearings in the axle housing; a sleeve 15 with a groove on each end slidably mounted upon the part 3 of the axle near its inner end; a collar 24 secured upon the part 3 of the axle near its center; a fixed rod 21 carried by the axle housing; a yoke 18 slidably mounted upon said rod and having a flange on each end, one adapted to engage the groove on the inner end of the sleeve 15 and the other to engage the groove upon the collar 13 of the clutch member 12; two levers 27 and 28 pivoted to the axle housing and having their inner ends engaging the flange upon the outer end of the sleeve 15; a yoke 30 encircling the part 3 of the axle adjacent to the inward face of the collar 24; rods 29 connecting the yoke and levers and means for operating the levers 27 and 28 independently of the movement of the car.

5. An automatic friction clutch differential comprising, a live axle; a clutch member 5 secured upon the inner end of one part 2 of the live axle and having secured to it the crown wheel of the main drive; a complementary clutch member 12 mounted by means of a grooved collar 13 upon the inner end of the second part 3 of the live axle slidable endwise thereon but rotatable therewith, the two parts of the live axle being mounted in ball or roller bearings in the axle housing, a sleeve 15 with a groove on each end slidably mounted upon the part 3 of the axle near its inner end; a collar 23 secured upon the part 3 of the axle between the sleeve 15 and the end; a fixed rod 21 carried by the axle housing; a yoke 18 slidably mounted upon said rod and having a flange on each end, one adapted to engage the groove on the inner end of the sleeve 15 and the other to engage the groove upon the collar 13 of the clutch member 12; two levers 27 and 28 pivoted to the axle housing and having their inner ends engaging the flange upon the outer end of the sleeve 15; a yoke 30 encircling the part 3 of the axle adjacent to the inward face of the collar 24; rods 29 connecting the yoke and levers and means for operating the levers 27 and 28 independently of the movement of the car.

6. An automatic friction clutch differential comprising, a live axle; a clutch member 5 secured upon the inner end of one part 2 of the live axle and having secured to it the crown wheel of the main drive; a complementary clutch member 12 mounted by means of a grooved collar 13 upon the inner end of the second part 3 of the live axle slidable endwise thereon but rotatable therewith, said collar 13 carrying also the clutch spider, the two parts of the live axle being mounted in ball or roller bearings in the axle housing; a sleeve 15 with a groove on each end slidably mounted upon the part 3 of the axle near its inner end; two collars 23 and 24 secured upon the part 3 of the axle, one near its inner end between the sleeve 15 and the end and one near its center; a fixed rod 21 carried by the axle housing; a yoke 18 slidably mounted upon said rod and having a flange on each end, one adapted to engage the groove on the inner end of the sleeve 15 and the other to engage the groove upon the collar 13 of the clutch member 12; two levers 27 and 28 pivoted to the axle housing and having their inner ends engaging the groove upon the outer end of the sleeve 15; a yoke 30 encircling the part 3 of the axle adjacent to the inward face of the collar 24; rod 29 connecting the yoke and levers and a rod 32 connected at its one end by an arm 31 to the lever 28 and passing out through the housing and connected at its other end to a lever positioned adjacent to the driver's seat and against a quadrant in which it may be locked.

In testimony that I claim the foregoing as my invention I have signed my name, in presence of two subscribing witnesses, this 17th day of May, 1919.

ROBERT WILLIAM ALLISON WARREN.

Witnesses:
 CHARLES JOHN EFFORD,
 LESLIE VERNON DAVEY.